(12) United States Patent
Waite et al.

(10) Patent No.: US 8,432,059 B2
(45) Date of Patent: Apr. 30, 2013

(54) DYNAMIC ELECTRICAL LOAD MANAGEMENT

(75) Inventors: Benjamin D. Waite, Seattle, WA (US); Jeffrey J. White, Shoreline, WA (US); Warren A. Atkey, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/371,859

(22) Filed: Feb. 13, 2012

(65) Prior Publication Data

US 2012/0146405 A1  Jun. 14, 2012

Related U.S. Application Data

(62) Division of application No. 11/954,480, filed on Dec. 12, 2007.

(51) Int. Cl.
*G05B 15/00* (2006.01)

(52) U.S. Cl.
USPC .............................. 307/9.1; 700/291; 700/295

(58) Field of Classification Search .................... 701/36, 701/102; 307/9.1, 31, 32, 34, 35, 38, 39; 700/291, 295
See application file for complete search history.

(56) References Cited

U.S. PATENT DOCUMENTS

| | | | |
|---|---|---|---|
| 3,842,249 A | 10/1974 | Geyer et al. | |
| 4,694,192 A | 9/1987 | Payne et al. | |
| 5,543,667 A | 8/1996 | Shavit et al. | |
| 5,583,419 A | 12/1996 | Haller | |
| 7,207,521 B2 | 4/2007 | Atkey | |
| 7,210,653 B2 | 5/2007 | Atkey et al. | |
| 7,562,234 B2 | 7/2009 | Conroy et al. | |
| 7,786,617 B2 * | 8/2010 | Paik et al. | 307/64 |
| 2002/0128759 A1 | 9/2002 | Sodoski et al. | |
| 2005/0006954 A1 | 1/2005 | Bowman et al. | |
| 2006/0174629 A1 | 8/2006 | Michalko | |
| 2008/0058998 A1 * | 3/2008 | Breit | 700/295 |

FOREIGN PATENT DOCUMENTS

JP 08289476 A * 11/1996

OTHER PUBLICATIONS

A. Hiskens, B. Gong, "Voltage stability enhancement via model predictive control of load", Intelligent Automation and Soft Computing, vol. 12, No. 1, 2006, pp. 117-124.*
Patent Cooperation Treaty International Search Report and Written Opinion for PCT/US2008/085009 filed Dec. 26, 2008; mailed Aug. 27, 2009.

* cited by examiner

*Primary Examiner* — Daniel Cavallari
(74) *Attorney, Agent, or Firm* — Klintworth & Rozenblat IP LLC (57) ABSTRACT

In one embodiment, a method is used to provide dynamic electrical power management which may minimize the potential for overload conditions and may ensure that system performance limits are maintained. The method may dynamically limit the primary load system power draw in response to the net power draw of all other electrical power users on the aircraft which may ensure that the total power levels remain below critical limits. The method may also provide predictive controls to handle rapid load transients. Additionally, if vital functions are not being met, the method may shed other selected aircraft electrical loads which may ensure that adequate power is provided to the primary load system.

25 Claims, 9 Drawing Sheets

DYNAMIC ELECTRICAL LOAD MANAGEMENT

CROSS-REFERENCES TO RELATED APPLICATIONS

The present application claims priority to and is a divisional of U.S. patent application Ser. No. 11/954,480 entitled "DYNAMIC ELECTRICAL LOAD MANAGEMENT" and filed Dec. 12, 2007 with the United States Patent and Trademark Office, the contents of which is hereby incorporated by reference.

BACKGROUND

Aircraft secondary power has traditionally been extracted through pneumatic power (engine bleed air), electrical power (shaft driven generators), and hydraulic power (via shaft driven pumps, augmented by pneumatic driven pumps). Pneumatic power has traditionally been used for functions such as hydraulics power augmentation, Environmental Control Systems (ECS), ice protection, nitrogen generation (fuel inerting), and engine starting. Electrical power has traditionally been used for ECS, cabin services, avionics, galley refrigeration, and others miscellaneous functions. In those traditional architectures, the pneumatic and electrical power have been isolated and managed separately. In either case, the designers recognize that the pneumatic and electrical power sources have limits and that the extraction of power from these sources must be managed to ensure critical limits are not exceeded.

Traditionally, electrical load management has been accomplished in a mostly discrete (on/off) manner. Most loads are either allowed to draw power or not. For example, load shedding of specific power users in the event of an overload, and sequenced restoration of electrical power users after the overload condition has ceased.

In some cases, electrical load management has utilized partial load reduction for some power users. However, these reductions were still discrete steps.

Pneumatic load management has also used similar techniques such as load management via discrete shedding of associated power users (pneumatic load either being completely off or on) or discrete load reduction (loads being set to predetermined states that reduce power extraction). However, pneumatic power systems also provide more dynamic, real time load management capabilities. The bleed extraction ports naturally limit the total flow, therefore protecting the engine from excess power extraction under most operating cases (in some cases discrete load management must be employed to stay below engine limits). Additionally, when the bleed source is at or near its extraction limits, a pneumatic power system will naturally share power between users. In this case, as one power user draws more flow, another users flow will naturally droop. These sorts of natural power sharing do not occur in the electrical power realm.

A new secondary power extraction architecture has been developed for the 787 aircraft. This secondary power extraction architecture does not use pneumatic power (bleed air). In this case, the traditional bleed air users use electric power. An outcome of this architecture is a dramatic increase in the electrical power usage levels and a significant increase in the number of electrical power users to integrate and manage via electrical power load management. Although many of the traditional electrical load management techniques discussed above can still be effectively used in this case, they did not offer analogous functionality and flexibility that the dynamic, real time load management capabilities of pneumatic systems offered.

A method and/or system for dynamic management of electrical power loads is needed in order to decrease one or more problems, such as the potential for overload conditions, of one or more of the existing systems and/or methods in aircraft, non-aircraft, vehicles, structures, and/or devices.

SUMMARY

In one aspect of the disclosure, a method is disclosed for dynamically managing electrical load. In one step, the total electrical load power consumption is continually measured. In another step, the electrical power to the primary load system is progressively and proportionately reduced whenever the total electrical load power consumption at least one of exceeds and is about to exceed a threshold electrical power limit.

In another aspect of the disclosure, a method is disclosed for managing predicted electrical power load. In one step, a secondary load system electrical power load is predicted. In another step, electrical power is reduced to a primary load system to avoid exceeding a threshold electrical power limit.

In another aspect of the disclosure, a method is disclosed for managing electrical power overload. In one step, electrical power is severed to a primary load system after a pre-determined time limit after a large secondary load system electrical power load occurred which was not anticipated and which resulted in an electrical power overload.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
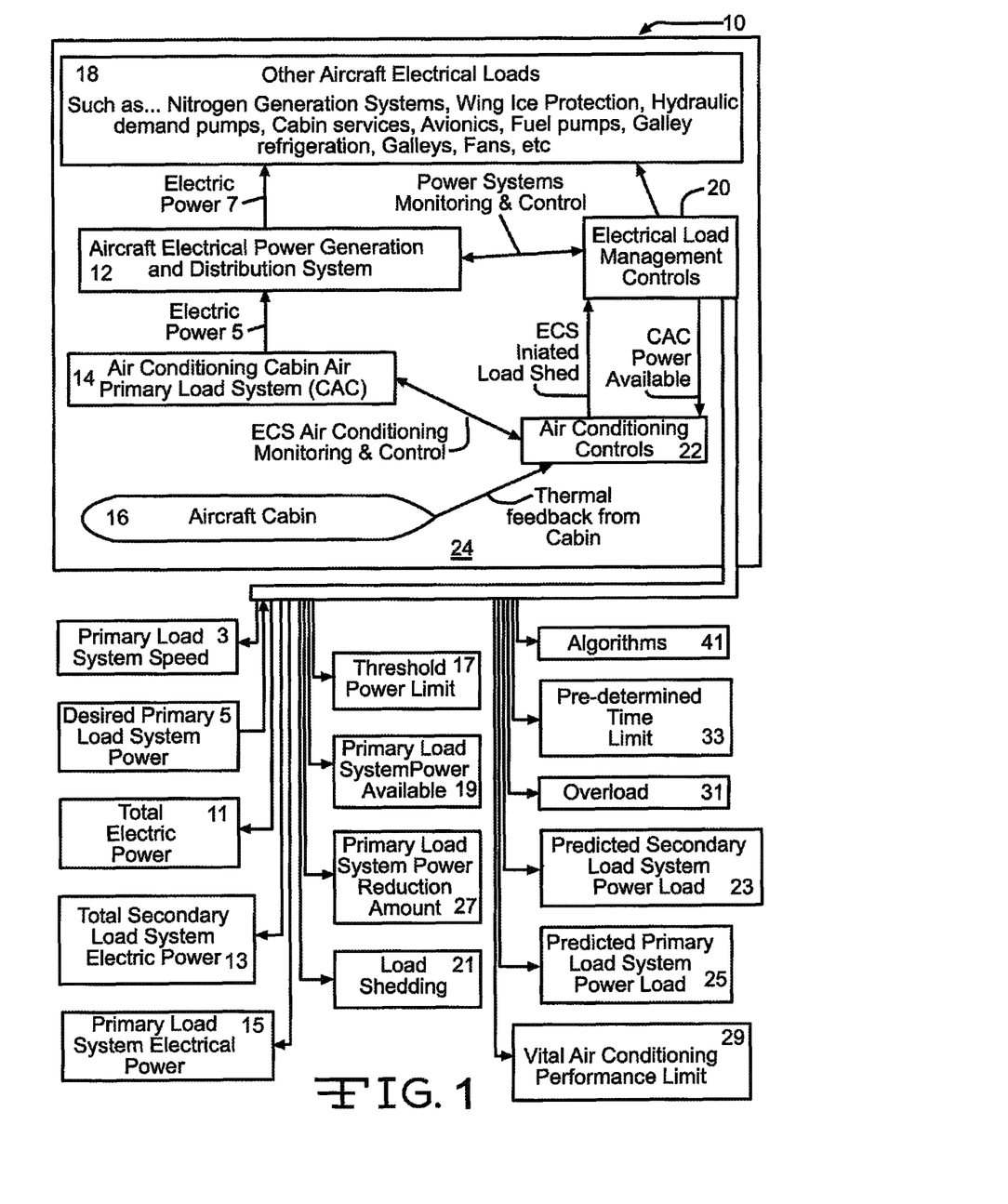
FIG. 1 shows a system block diagram which may be used under one embodiment of the disclosure to manage dynamic electrical load.

FIG. 1 shows a system block diagram 10 which may be used under one embodiment of the disclosure to manage dynamic electrical load. The system 10 may include the following: an electrical power generation and distribution system 12; a primary load system 14; a compartment 16; a secondary load system 18; an electrical load management control system 20; and/or an air conditioning control system 22. In other embodiments, the system 10 may include varying devices and/or systems.

The system 10 may be used to manage dynamic electrical load of an aircraft 24. In other embodiments, the system 10 may be used to manage dynamic electrical loads of non-aircraft vehicles, devices, and/or structures. The electrical power generation and distribution system 12 may include one or more power generating and/or distributing device, such as a generator, a power bus and/or other types of devices, which may generate and distribute electrical power 5 to the primary load system 14 and electrical power 7 to the secondary systems 18. The primary load system 14 may be driven by a motor, a motor controller, and/or other motor combination.

In one embodiment, the primary load system 14 may comprise an air-conditioning air compressor which generates conditioned air for the compartment 16, which may comprise an aircraft cabin. In other embodiments, the primary load system 14 may comprise one or more of a motor (with or without a motor controller) driving a pump (water, hydraulic, fuel, etc.) or mechanical system (conveyor belt, actuator for a control surface, landing gear, door, etc.), a resistive load such as a galley, heating system, or entertainment system, or another type of primary load system. In another embodiment, the secondary load system 18 may include one or more secondary load systems such as non-compressor load systems comprising a nitrogen generation system, a wing ice protection system, a hydraulic demand pump, a compartment service system, an avionics system, a fuel pump system, a galley refrigeration system, a fan system, and/or other type of non-compressor load system. In still other embodiments, the secondary load system 18 may comprises any type of secondary load systems. In one embodiment, the threshold electrical power limit 17 may comprise one or more of a critical threshold of an engine, electrical generator, and/or electrical power system device.

The electrical load management control system 20 may comprise a computer and/or a control system which monitors and controls continuously in real-time the electrical power generation and distribution system 12 and/or the secondary load systems 18. The air conditioning control system 22 may comprise a computer and/or a control system which monitors and controls the primary load system 14, and/or which receives thermal feedback from the compartment 16. The electrical load management control system 20 and the air conditioning control system 22 may communicate with each other.

The electrical load management control system may determine the following: total electrical power 11 being used by the system 10, comprising both the primary load system 14 and the secondary load systems 18; total secondary load systems 18 electrical power 13 being used/consumed by the system 10; primary load system 14 electrical power 15 being used/consumed by the system 10; a threshold electrical power limit 17 of the system 10; desired primary load system power 5; primary load system speed 3; primary load system 14 electrical power available 19 to the system 10; a primary load system electrical power reduction amount 27 to avoid exceeding the threshold electrical power limit 17 of the system 10; necessary electrical power load shedding 21 of the primary load system 14 and/or the secondary load systems 18 to avoid an overload 31 of the system 10; a predicted secondary load system 18 electrical power load 23 and/or predicted primary load system 14 electrical power load 25; a primary load system 14 electrical power performance criteria based on vital air conditioning performance limits 29; a pre-determined time limit 33 of an overload 31 of the system 10; and/or other determinations regarding the electrical load of the system 10. The primary load system 14 electrical power available 19 to the system 10 may be based on one or more electric power limiting algorithms 41 which are designed to prevent electrical overload 31 of the system 10 by limiting the power available 19 to the primary load system 14 in order to prevent an overload 31 of the system 10.

Figure 2:
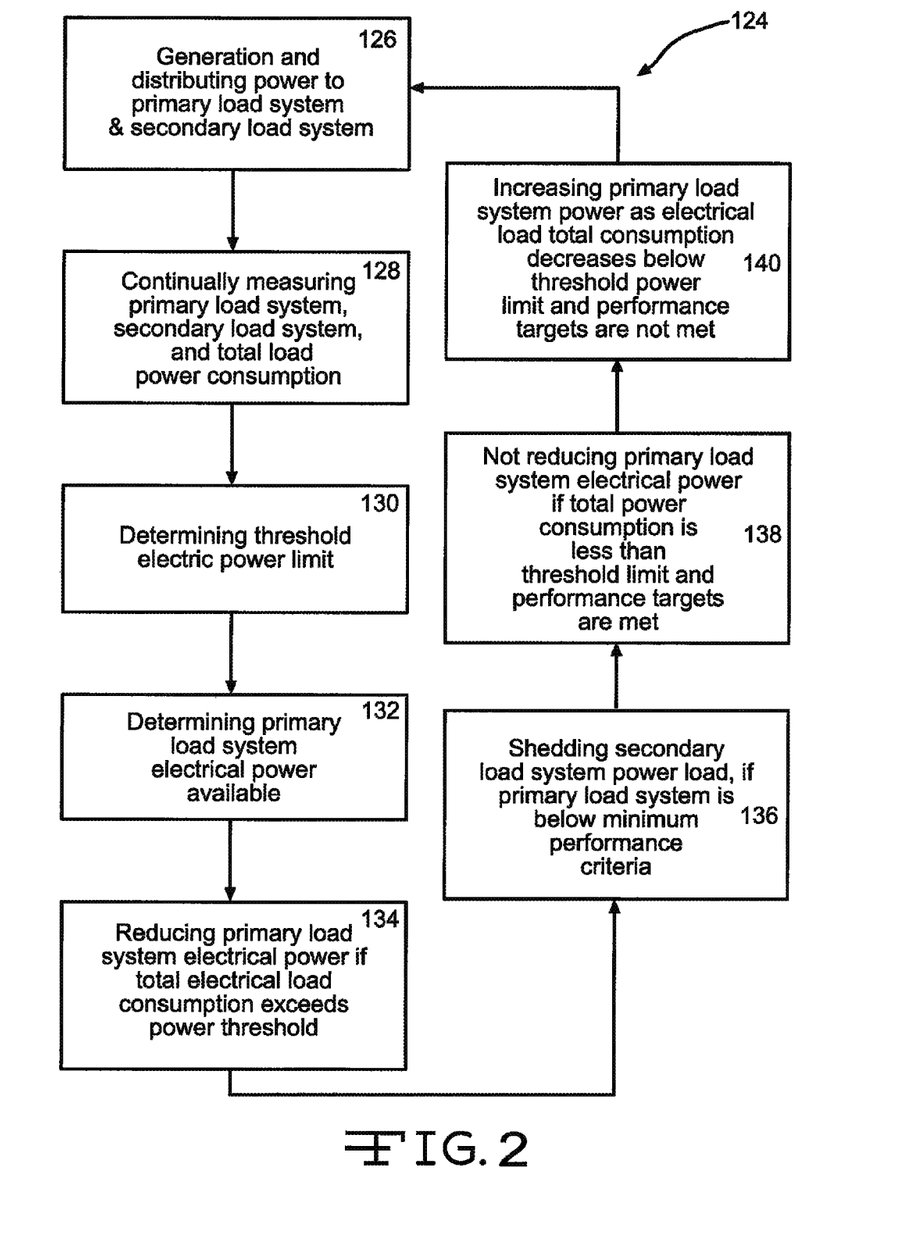
FIG. 2 shows a flowchart of one embodiment of a method for managing dynamic electrical load.

FIG. 2 shows a flowchart of one embodiment of a method 124 for managing dynamic electrical load. The method 124 may be implemented to manage continuously, in real-time, dynamic electrical load in the system 10 of FIG. 1, in an aircraft 24, and/or in a non-aircraft vehicle, structure, or device. Each of the below referenced steps of FIG. 2 are optional. As shown in FIG. 2, in one step 126, an electrical power generation and distribution system 12 may generate and distribute electrical power 5 to the primary load system 14 and electrical power 7 to the secondary load systems 18.

In another step 128, the primary load system 14 electrical power consumption 15 may be continually measured, the total secondary load system 18 electrical power consumption 13 may be continually measured, and/or the total electrical load power consumption 11 may be continually measured. In one embodiment, the total electrical load power consumption may be determined by summing/totaling both the primary load system 14 electrical power consumption 15 and the total secondary load system 18 electrical power consumption 13. In another embodiment, the total secondary load system 18 electrical power consumption 13 may be determined by subtracting the primary load system 14 electrical power consumption 15 from the total electrical load power consumption 11. In still another embodiment, the primary load system 14 electrical power consumption 15 may be determined by subtracting the total secondary load system 18 electrical power consumption 13 from the total electrical load power consumption 11.

In one step 130, a threshold electrical power limit 17 may be determined, which may comprise the total threshold electrical power limit 17 of the primary load system 14 and the secondary load system 18 combined. In one step 132, the primary load system 14 electrical power available 19 may be calculated by subtracting the secondary load system 18 electrical power consumption 13 from the threshold electrical power limit 17. In another step 134, the electrical power 5 to the primary load system 14 may be reduced whenever the total electrical load power consumption 11 exceeds and/or is about to exceed a threshold electrical power limit 17.

In one embodiment, step 134 may include predicting a secondary load system 18 electrical power load 23, which may be large and/or rapid, and reducing the electrical power 5 to the primary load system 14 to avoid exceeding the threshold electrical power limit 17 and/or experiencing an electrical power overload 31. In another embodiment, step 134 may include, when a large secondary load system 18 electrical power load 13 occurs which was not anticipated and which resulted in an electrical power overload 31, severing the electrical power 5 to the primary load system 14 after a pre-determined time limit 33. The electrical power 5 to the primary load system 14 may be restored when the total electrical load power consumption 11 is reduced to and/or below the threshold electrical power limit 17.

In another embodiment, step 134 may comprise progressively and proportionately reducing the electrical power 5 to the primary load system 14 as the total electrical load power consumption 11 progressively approaches or increases over the threshold electrical power limit 17. In still another embodiment, step 134 may comprise reducing the electrical power 5 to the primary load system 14 by a primary load system electrical power reduction amount 27. The primary load system electrical power reduction amount 27 may be calculated by determining the primary load system 14 electrical power 15 being used, subtracting the threshold electrical power limit 17, and adding the total secondary load system 18 electrical power 13 consumption. In still another embodiment, step 134 may comprise reducing the primary load system 14 electrical power 15 being used/consumed to the calculated primary load system 14 electrical power available 19. A rate of change of the primary load system power 5 may vary based on conditions, such as the amount of overload and/or flight phase in an aircraft. The rate of change of the primary load system power 5 may also vary based on conditions, such as the amount of margin from a threshold and/or flight phase.

In step 136, after the electrical power 5 to the primary load system 14 is reduced because the total electrical load power consumption 11 exceeded and/or was about to exceed the threshold electrical power limit 17, one or more electrical power loads 13 of the secondary load electrical systems 18 may be shed if the primary load system 14 electrical power 15 is below the vital air conditioning performance limit 29. In step 138, the electrical power 5 to the primary load system 14 may not be reduced if the total electrical load power consumption 11 remains below and/or equal to the threshold electrical power limit 17. In step 140, after the electrical power 5 to the primary load system 14 was reduced because the total electrical load power consumption 11 exceeded and/or was about to exceed the threshold electrical power limit 17, the electrical power 5 to the primary load system 14 may be progressively and/or proportionately increased to the primary load system 14 as the total electrical load power consumption 11 progressively and/or proportionately decreases.

Figure 3:
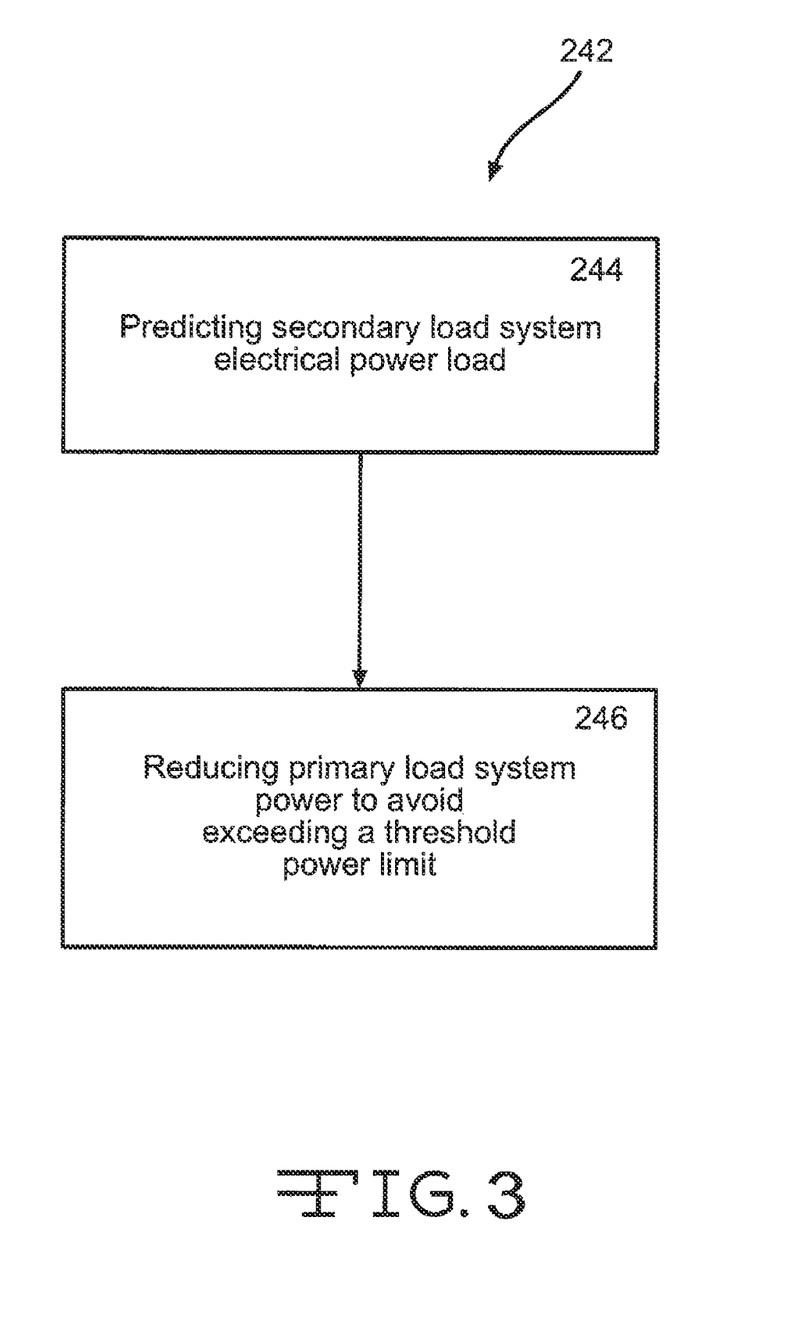
FIG. 3 shows a flowchart of one embodiment of a method for managing predicted electrical power load.

FIG. 3 shows a flowchart of one embodiment of a method 242 for managing predicted electrical power load 23 and/or 25. The method 242 may be implemented to manage continuously, in real-time, predicted electrical power load 23 and/or 25 in the system 10 of FIG. 1, in an aircraft 24, and/or in a non-aircraft vehicle, structure, or device. In one step 244, a secondary load system 18 electrical power load 23 may be predicted. In another step 246, the electrical power 5 to the primary load system 14 may be reduced to avoid exceeding a threshold electrical power limit 17. The electrical power 5 to the primary load system 14 may be reduced by an amount of power proportional to an amount of predicted total electric load power consumption 23 and/or 25 above the threshold electrical power limit 17. The reduction of electrical power 5 to the primary load system 14 may be done progressively and/or proportionately. The electrical power 5 to the primary load system 14 may be suddenly reduced and quickly restored to the primary load system 14 at a lower power level without shutting off the primary load system.

Figure 4:
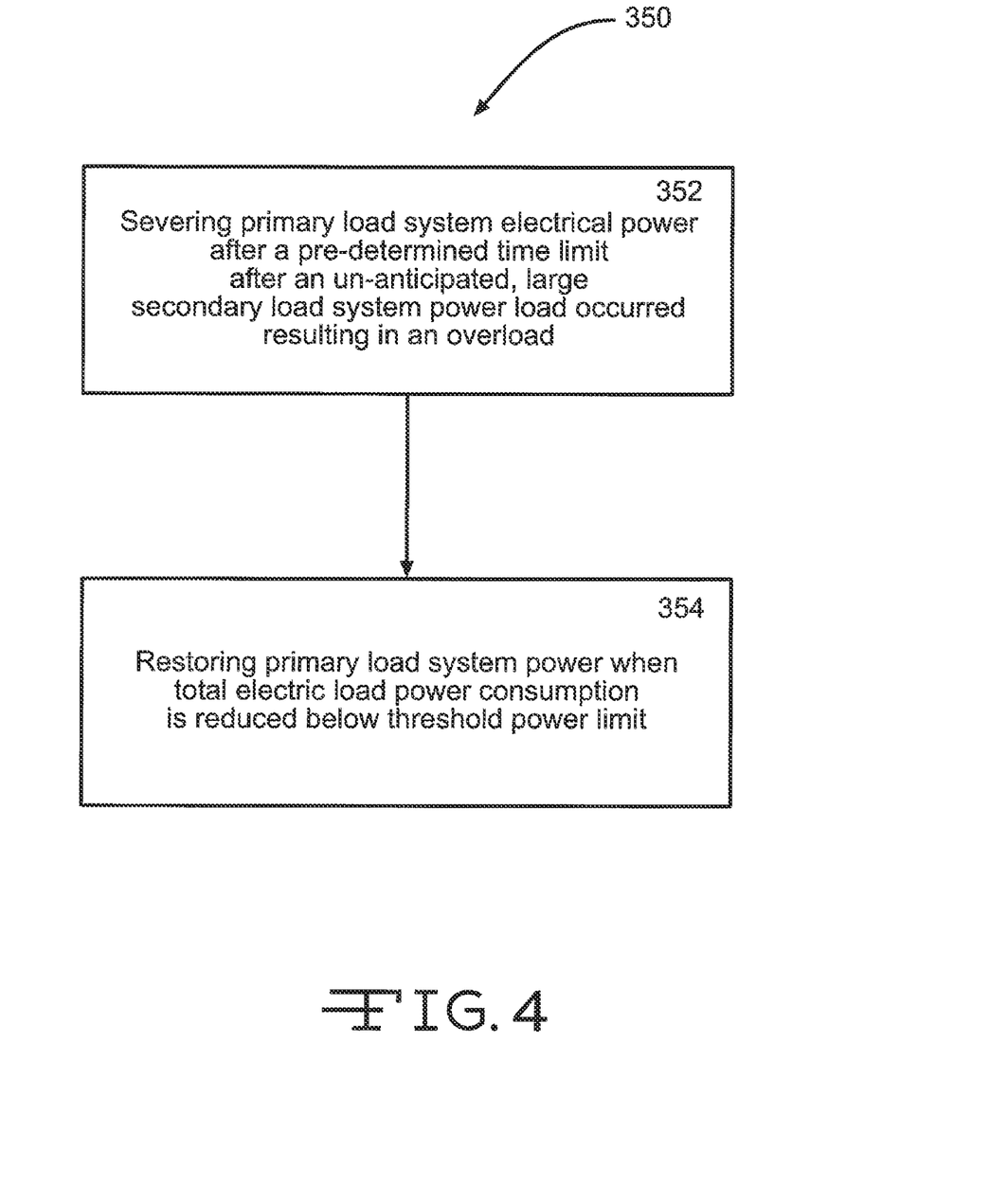
FIG. 4 shows a flowchart of one embodiment of a method for managing electrical power overload.

FIG. 4 shows a flowchart of one embodiment of a method 350 for managing electrical power overload 31. The method 350 may be implemented to manage continuously, in real-time, electrical power overload 31 in an aircraft 24, and/or in a non-aircraft vehicle, structure, or device. In one step 352, electrical power 5 to the primary load system 14 may be severed after a pre-determined time limit 33 after a large secondary load system 18 electrical power load 13 occurred which was not anticipated and which resulted in an electrical power overload 31. In another step 354, the electrical power 5 to the primary load system 14 may be restored when a total electrical load power consumption 11 is reduced to and/or below the threshold electrical power limit 17. Alternatively, the electrical power 5 to the primary load system 14 may be suddenly reduced and quickly restored to the primary load system 14 at a lower power level without shutting off and restoring the primary load system.

Figure 5:
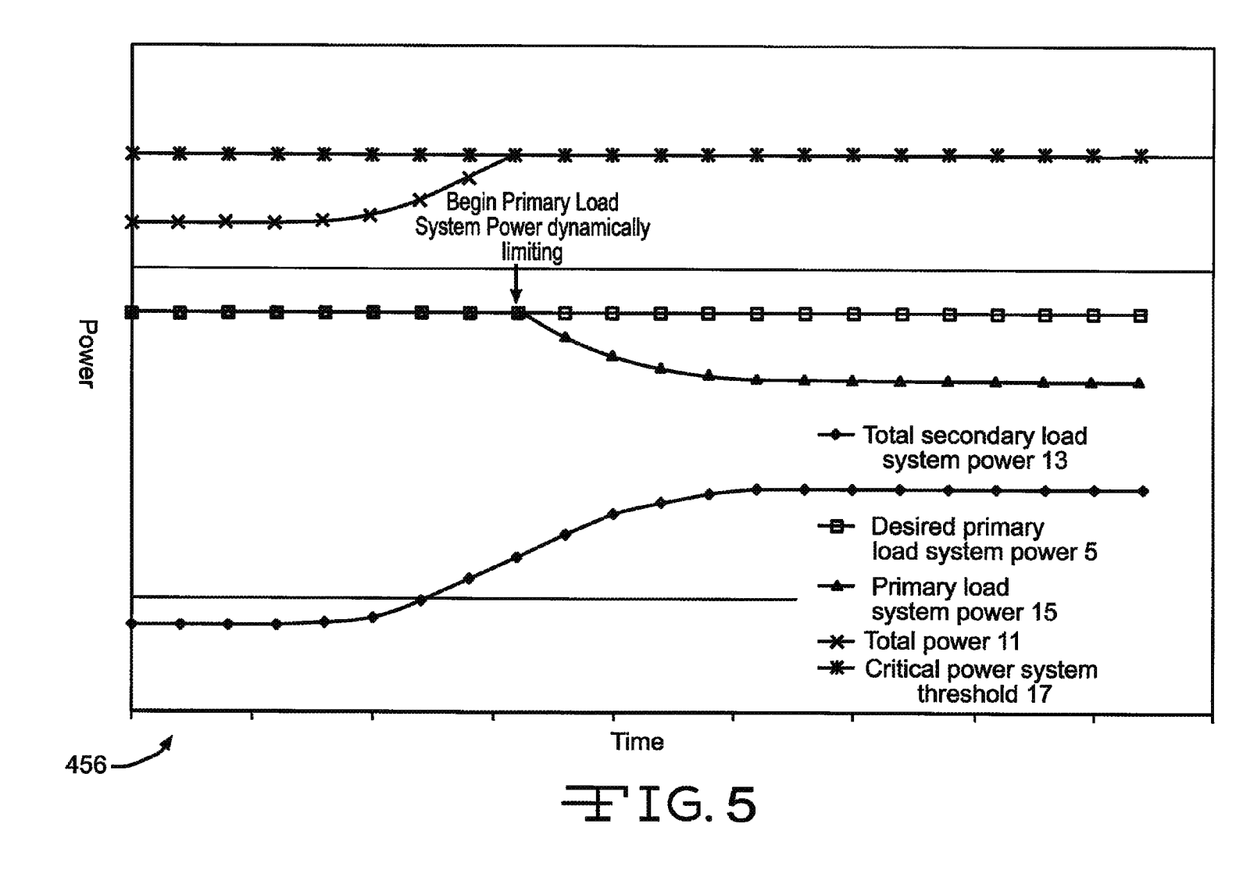
FIG. 5 shows a graph charting time versus power for one embodiment implementing a method of the disclosure.

FIG. 5 shows a graph 456 charting time versus power for one embodiment implementing a method of the disclosure. Initially, the primary load system 14 is operating at a stable power 15 level in line with the power level desired 5 by the air conditioning system 22. At this point, the total electrical power 11 is below the critical threshold 17 for the system 10. Then, the secondary load systems 18 increases the electrical power 13 they use to the point where the total power draw 11 reaches the critical power system threshold 17. At that moment, the load management controls 20 send a reduced primary load system power available limit 19 and/or 27 to the primary load system controls 22. In response, the primary load system controls 22 reduce the primary load system 14 speed and power draw 15 below the desired primary load system power 5 in compliance with the primary load system power available limit 19 and/or 27. As such, the total power draw 11 does not exceed the critical power system threshold 17.

Figure 6:
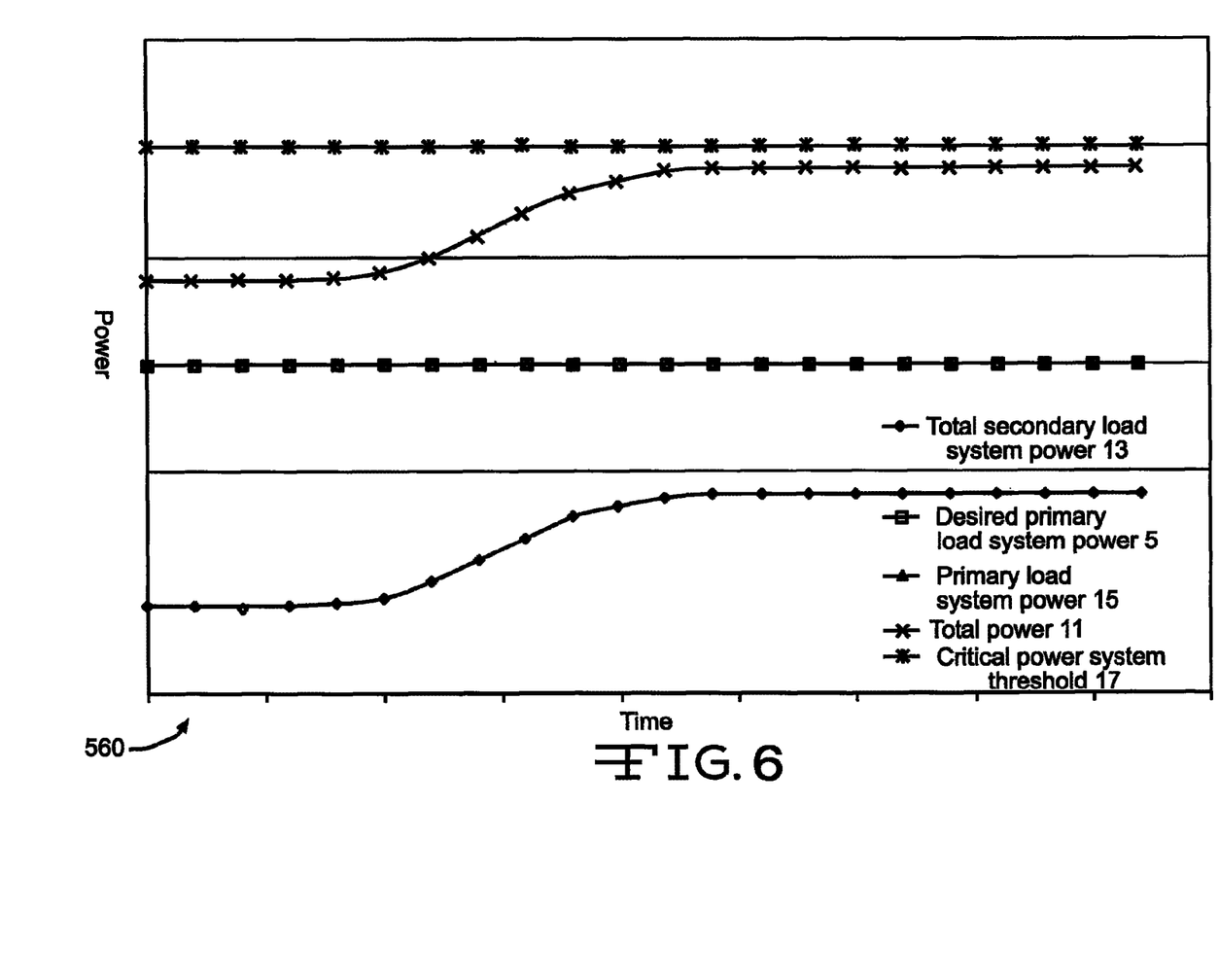
FIG. 6 shows a graph charting time versus power for another embodiment implementing a method of the disclosure.

FIG. 6 shows a graph 560 charting time versus power for another embodiment implementing a method of the disclosure. FIG. 6 is much like FIG. 5, except the increase in secondary load system 18 power 13 does not cause the total power 11 to reach the critical power system threshold 17. As such, the primary load system power 15 is able to remain at the level desired 5 by the air conditioning system 22.

Figure 7:
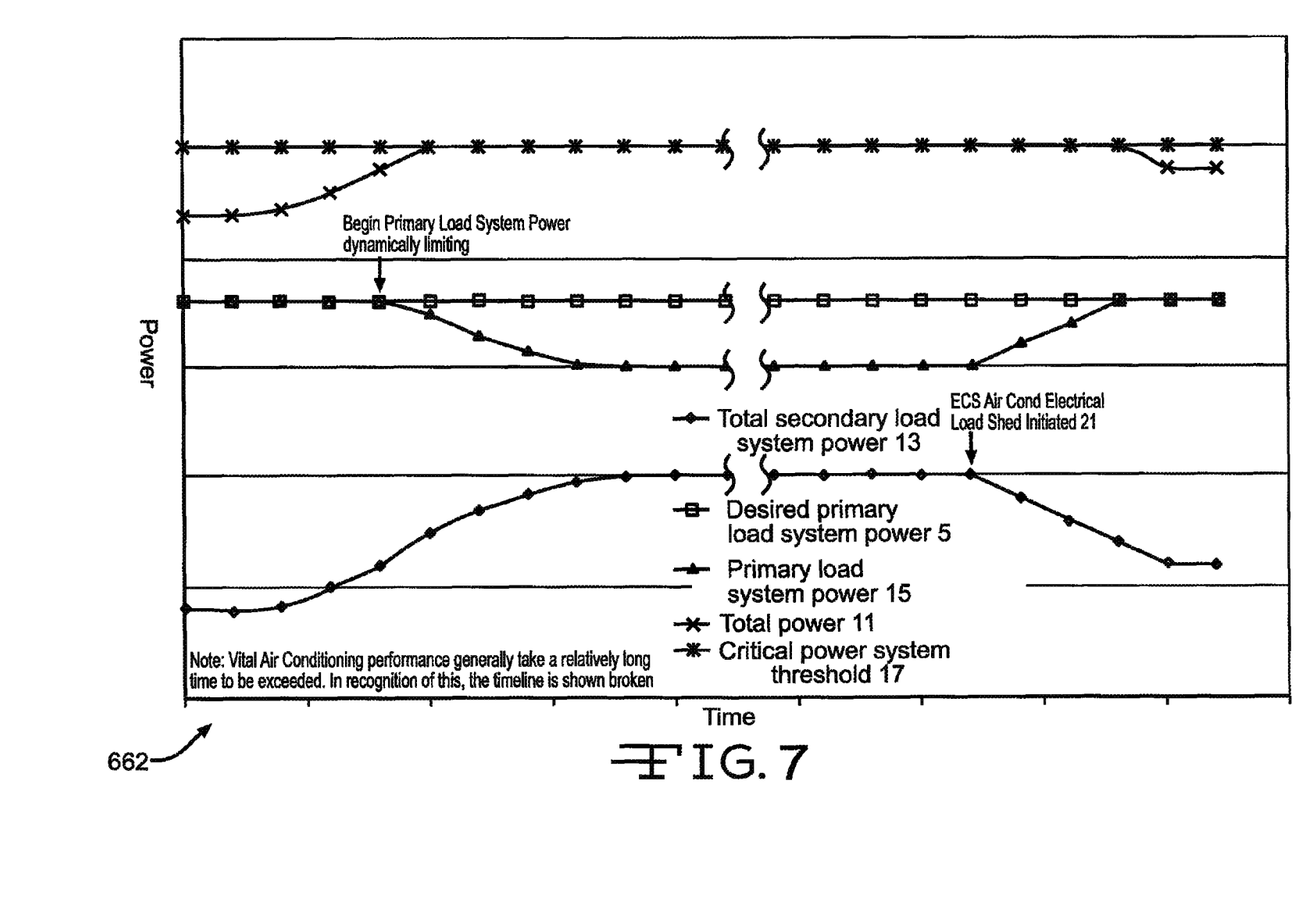
FIG. 7 shows a graph charting time versus power for another embodiment implementing a method of the disclosure.

FIG. 7 shows a graph 662 charting time versus power for another embodiment implementing a method of the disclosure. FIG. 7 is much like FIG. 5 except the load management controls 20 are limiting the primary load system power 15 to a level below that desired 5 by the air conditioning system 22. However, in this case, the limitation imposed on the primary load system power 15 by the load management controls 20 cause a vital air conditioning performance limit 29 to be exceeded. In most cases, these air conditioning limits 29 are in the form of temperature limits for the aircraft cabin 16. Thermal transients in the aircraft cabin 16 are relatively slow in nature. As such the timeline is shown broken. At the time the vital air conditioning performance limit 29 is exceeded, the air conditioning controls 20 send shed commands 21 to selected aircraft systems to reduce cabin 16 heat loads and/or to reduce the secondary load system 18 electrical loads 13. In this example, the secondary load system 18 power 13 reduces sufficiently to allow the primary load system 14 power 15 to again operate at the level desired 5 by the air conditioning system 22. Vital air conditioning performance 29 is re-established and the critical power system thresholds 17 are not exceeded.

Figure 8:
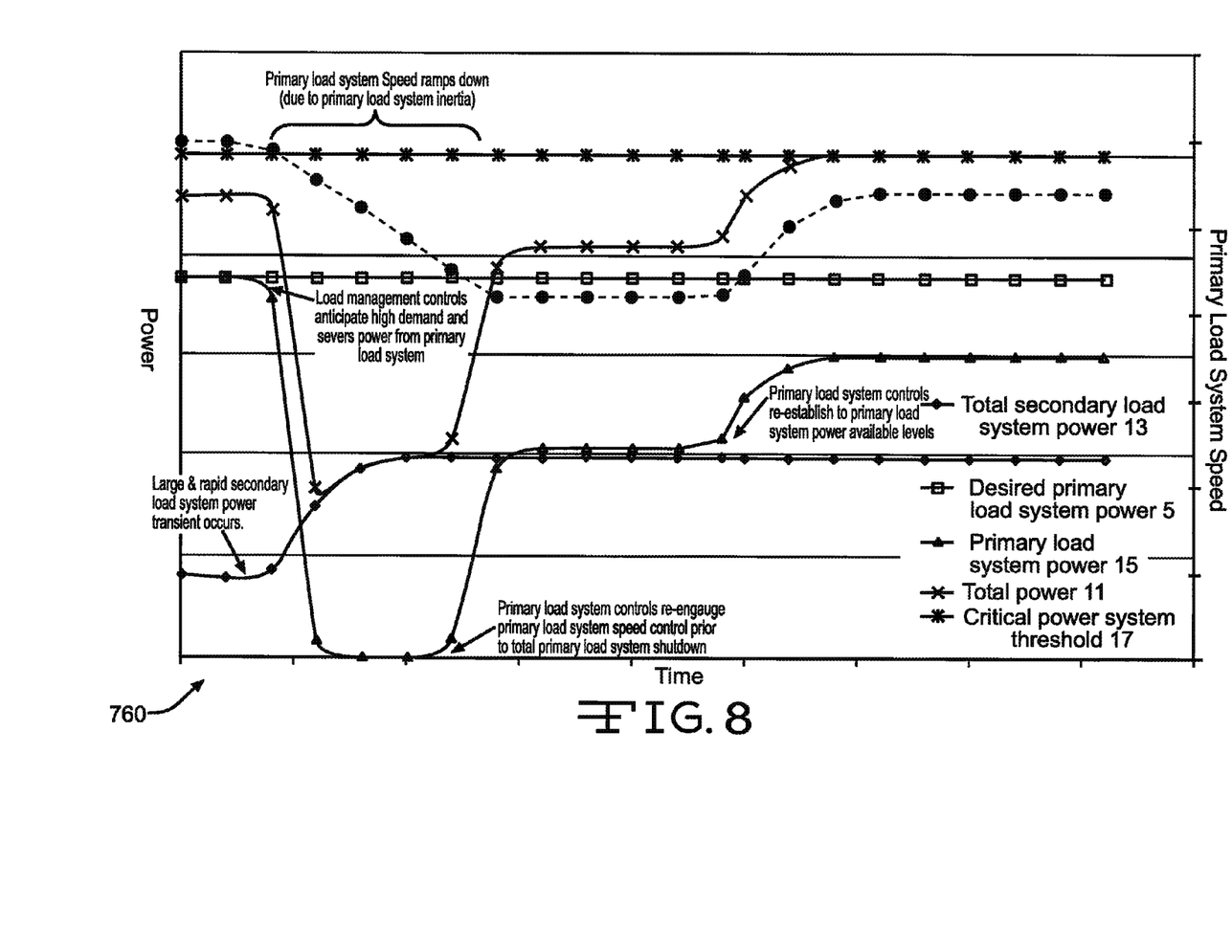
FIG. 8 shows a graph charting time versus power for another embodiment implementing a method of the disclosure.

FIG. 8 shows a graph 760 charting time versus power for another embodiment implementing a method of the disclosure. In this example, a large and rapid secondary load system 18 power transient 13 is anticipated by the load management controls 20. In this case, the primary load system 14 power 15 is quickly reduced to avoid an electric power system 5 overload 31. Shortly thereafter, the primary load system 14 power 15 is allowed to again to track the load management primary load system power available signal 19.

Figure 9:
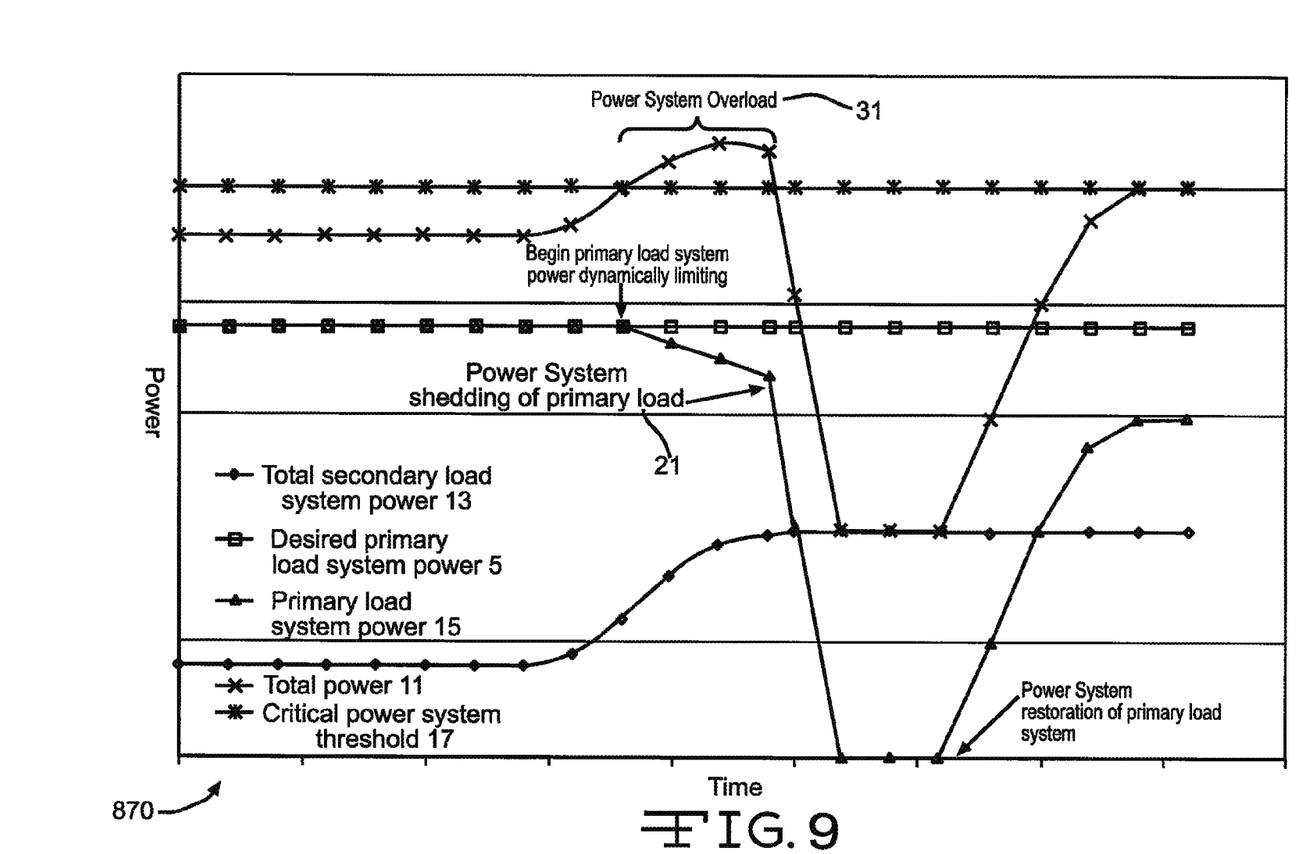
FIG. 9 shows a graph charting time versus power for another embodiment implementing a method of the disclosure.

FIG. 9 shows a graph 870 charting time versus power for another embodiment implementing a method of the disclosure. In this example, an unlikely scenario occurs where there is a large and rapid secondary load system 18 power transient 13 which is not anticipated by the load management controls 20. In this case, the primary load system 14 power 15 can not reduce fast enough to avoid exceeding the critical power system overload threshold 31. After the overload 31 has occurred beyond a predetermine time limit 33, the load management controls 20 sever power 15 and 21 from the air conditioning system primary load system 14 to protect the power system from exceeding threshold power limits. The primary load system 14 operation is later restored, and operation is then in line with the load management primary load system power available limit 19.

One or more embodiments of the disclosure may provide improved dynamic electrical power management in order to reduce the potential for overload conditions of one or more of the prior art power management systems and/or methods.

It should be understood, of course, that the foregoing relates to exemplary embodiments of the disclosure and that modifications may be made without departing from the spirit and scope of the disclosure as set forth in the following claims.

The invention claimed is:

1. A method for managing predicted electrical power load comprising:
    predicting a secondary load system electrical power load; and
    reducing electrical power to a primary load system, by an amount of power proportional to an amount of predicted secondary load power consumption above a threshold electrical power limit or by an amount of power proportional to an amount of predicted total electrical load power consumption above the threshold electrical power limit, to avoid exceeding a threshold electrical power limit.

2. The method of claim 1 wherein the method is used to manage the predicted electrical power load in an aircraft.

3. The method of claim 1 comprising reducing the electrical power to the primary load system by the amount of power proportional to the amount of the predicted secondary load system power consumption above the threshold electrical power limit.

4. The method of claim 1 comprising reducing the electrical power to the primary load system by the amount of the power proportional to the amount of the predicted total electrical load power consumption above the threshold electrical power limit.

5. The method of claim 1 wherein the reduction of electrical power to the primary load system is done progressively.

6. The method of claim 1 wherein the reduction of electrical power to the primary load system is done proportionately.

7. The method of claim 1 further comprising restoring the electrical power to the primary load system at a lower power level.

8. The method of claim 1 further comprising determining an electrical power consumption of the primary load system.

9. The method of claim 1 further comprising determining an electrical power consumption of the secondary load system.

10. The method of claim 1 further comprising determining the threshold electrical power limit.

11. The method of claim 10 wherein the threshold electrical power limit comprises the threshold electrical power limit of both the primary load system and the secondary load system.

12. The method of claim 1 wherein the primary load system comprises at least one of a motor, a motor controller, a compressor, a compressor system, or an air conditioning cabin air compressor system, and the secondary load system comprises at least one of a non-compressor load system, nitrogen generation system, a wing ice protection system, a hydraulic demand pump system, a cabin service system, an avionics system, a fuel pump system, a galley refrigeration system, a galley system, or a fan system.

13. The method of claim 1 further comprising at least one of a generator, a power bus, a motor, or another power generating device supplying electrical power.

14. The method of claim 1 further comprising not reducing the electrical power to the primary load system if a total electrical load power consumption remains at least one of below or equal to the threshold electrical power limit.

15. The method of claim 1 further comprising, after the electrical power to the primary load system is reduced because the total electrical load power consumption was about to exceed the threshold electrical power limit, progressively increasing the electrical power to the primary load system as a total electrical load power consumption progressively decreases.

16. The method of claim 1 further comprising, after the electrical power to the primary load system is reduced because the total electrical load power consumption was about to exceed the threshold electrical power limit, shedding at least one electrical power load of secondary load electrical systems if the electrical power of the primary load system is below a vital primary system load performance limit.

17. The method of claim 1 further comprising, when the secondary load system electrical power load was not anticipated and results in an electrical power overload, after a pre-determined time limit severing the electrical power to the primary load system.

18. The method of claim 17 further comprising restoring the electrical power to the primary load system when a total electrical load power consumption is reduced to at least one of at or below the threshold electrical power limit.

19. An electrical load management system comprising:
    a computer;
    a non-transitory computer readable memory medium stored on the computer; and
    at least one processor operable to access from the non-transitory computer readable memory medium program instructions executable by the processor to:
    predict a secondary load system electrical power load; and
    reduce electrical power to a primary load system, by an amount of power proportional to an amount of predicted secondary load power consumption above a threshold electrical power limit or by an amount of power proportional to an amount of predicted total electrical load power consumption above the threshold electrical power limit, to avoid exceeding a threshold electrical power limit.

20. The system of claim 19 wherein the system comprises a vehicle.

21. A method for managing predicted electrical power load comprising:
    determining a threshold electrical power limit;
    predicting a secondary load system electrical power load; and
    reducing electrical power to a primary load system to avoid exceeding the threshold electrical power limit.

22. The method of claim 21 wherein the reducing further comprises reducing the electrical power to the primary load system to avoid a total electrical load power consumption exceeding the threshold electrical power limit.

23. The method of claim 22 wherein the total electrical load power consumption includes the electrical load power consumption of both the secondary load system and the primary load system.

24. A method for managing predicted electrical power load comprising:
   predicting a secondary load system electrical power load; and
   reducing electrical power to a primary load system when needed to avoid a total electrical power consumption exceeding a threshold electrical power limit and not reducing the electrical power to the primary load system if the total electrical power consumption remains below or equal to the threshold electrical power limit.

25. The method of claim 24 wherein the total electrical load power consumption includes the electrical load power consumption of both the secondary load system and the primary load system.

* * * * *